United States Patent [19]

Mulder

[11] Patent Number: 4,735,723
[45] Date of Patent: Apr. 5, 1988

[54] ANAEROBIC PURIFICATION OF WASTE WATER CONTAINING SULFATE AND ORGANIC MATERIAL

[75] Inventor: Arnold Mulder, Kluutring, Netherlands

[73] Assignee: Gist Brocades N. V., Netherlands

[21] Appl. No.: 35,619

[22] Filed: Apr. 3, 1987

[30] Foreign Application Priority Data

Apr. 16, 1986 [EP]  European Pat. Off. ........ 86200652.5

[51] Int. Cl.⁴ .............................................. C02F 3/28
[52] U.S. Cl. ..................................... 210/603; 210/617
[58] Field of Search ............... 210/603, 611, 617, 614, 210/615, 616, 631, 916, 612; 435/167

[56] References Cited

U.S. PATENT DOCUMENTS

| | | | |
|---|---|---|---|
| 4,211,647 | 7/1980 | Friedman et al. | 210/603 |
| 4,409,102 | 10/1983 | Tanner | 210/603 |
| 4,505,819 | 3/1985 | Barres et al. | 210/617 X |
| 4,560,479 | 12/1985 | Heijren | 210/603 |
| 4,568,457 | 2/1986 | Sullivan | 210/603 X |
| 4,584,271 | 4/1986 | Stern et al. | 210/611 X |
| 4,614,588 | 9/1986 | Li | 210/603 |
| 4,696,746 | 9/1987 | Ghosh et al. | 210/603 |

*Primary Examiner*—Tom Wyse
*Attorney, Agent, or Firm*—Bierman and Muserlian

[57] ABSTRACT

Waste water containing sulfate and organic material is purified by anaerobic biological waste water treatment where at least 80% of the sulfate is converted into hydrogen sulfide in an acidification process and at least 70% of the resulting hydrogen sulfide is removed from the waste water.

12 Claims, 1 Drawing Sheet

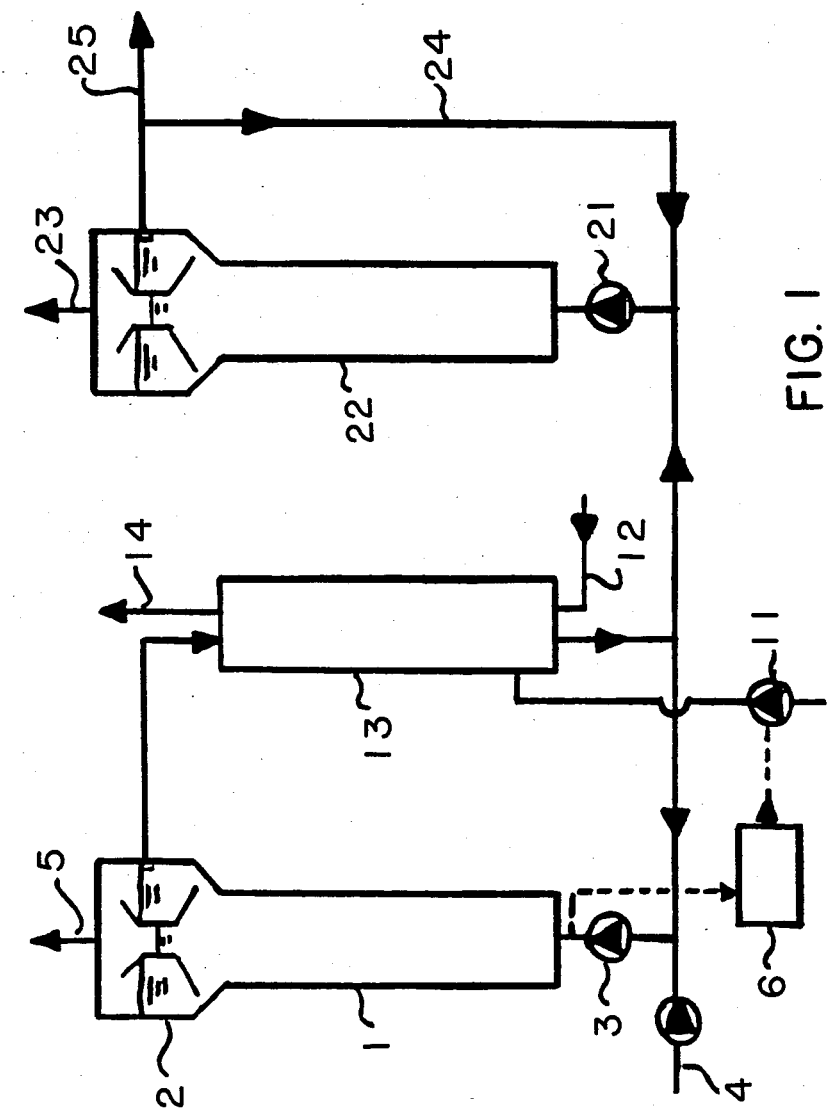
FIG. I

ANAEROBIC PURIFICATION OF WASTE WATER CONTAINING SULFATE AND ORGANIC MATERIAL

STATE OF THE ART

During anaerobic waste water treatment, sulfate, if present, will be reduced predominantly to hydrogen sulfide. In most cases, this is disadvantageous as it results in a decrease or even complete inhibition of the methanogenic capacity of the sludge and the production of a malodorous effluent. It is difficult to inhibit this sulfate reduction.

Therefore, the application of anaerobic purification techniques to highly contaminated waste waters is often limited by the high concentrations of $SO_4^{2-}$. Examples are the vinasses of fermentation processes such as alcohol, lactic acid, citric acid and penicillin. In such cases, $SO_4^{2-}$-concentrations of up to 4 g/l may occur (=1330 mg S/l). However, the application of anaerobic purification in this field is highly attractive, owing to the very high COD involved. Typical COD-loads are 10-60 ton/day, leading to expensive purification reactors.

The alternative route used in the majority of cases to handle these highly contaminated wastes is further concentration to a slurry that can be sold as a fodder additive. It appears, however, that in many cases the fodder market is not sufficiently large to serve as an outlet for this slurry. Another route is to use such a slurry for irrigation/fertilization of agricultural land, but here again, there are limits to the amount that can be applied per hectare.

Owing to these problems, and because of the methane production, anaerobic purification has become increasingly important for these highly contaminated waste waters. However, the high level of the $SO_4^{2-}$ concentration appeared to be a major obstacle. A general possibility to avoid the arising problems from the presence of $SO_4^{2-}$ in waste water is to bring about complete reduction of the $SO_4^{2-}$ to $H_2S$ and to remove the $H_2S$ continuously from the water to alleviate its toxic effect on methanogenesis.

French patent application No. 2,484,990 discloses the continuous purification of sulfate-containing waste water by treatment with anaerobic methanogenic bacteria and the removal of sulfides formed from the sulfates using a stripping gas. The elimination of the sulfides is carried out in an external gas stripper and the sulfate containing waste water is purified in an anaerobic waste water reaction space wherein at the same time the acidification and methanisation takes place To keep the acidification and methanisation working, the sulfide concentration is kept below 0.1 g/l in the reactor and therefore, the ratio of feed to this reactor must be 0.5 to 0.02 times the liquid feed to the gas stripper.

British Patent Application No. 2,143,810 describes a process wherein primary sulfur oxide-containing wastes, for example gypsum ($CaSO_4$) are biologically converted. The process of this application is carried out in an anaerobic reactor with suspended growth biomass and preferably, a continuous upflow expanded bed reactor or a fixed film reactor is used. Although it is suggested that the conversion rate in this process will be from about 8 to about 32 kg/m³ of reactor space per day in the examples, the average conversion rate is 1 kg $SO_4/m^3$ of space per day at most. The hydraulic velocity in the reactor is about 1.2-2.4 m/h. However applying this hydraulic liquid velocity in combination with the applied retention time of one day results in very wide reactor designs, which are economically unattractive for industrial application. The pH in the process of British Applcation No. 2,143,810 remains in the range of 7.0 and 8.0, regardless of the pH of the influent. The stripping of hydrogen sulfide in these pH ranges is unsatisfactory since the higher the pH, the worse the efficiency of the gas-stripper.

OBJECTS OF THE INVENTION

It is an obJect of the invention to provide a novel process for the purification of sulfate containing waste water wherein it is possible to reduce the sulfate ion capacity up to 30 kg of sulfate ions per cubic meter of reactor volume per day.

This and other objects and advantages of the invention will become obvious from the following detailed description.

THE INVENTION

The novel process of the invention for the purification of waste water containing sulfates and organic material by anaerobic biological waste water treatment is characterized by converting at least 80% of the sulfate ions by an acidification process into hydrogen sulfide and removing at least 70% of the hydrogen sulfide from the waste water.

The acidification stage of a 2-stage anaerobic purification process is advantageously used. The optimization of the sulfate conversion in the acidification stage of a two stage anaerobic digestion and the removal of hydrogen sulfide from the acidified waste water will prevent the inhibition of methane fermentation by hydrogen sulfide which will benefit the methane fermentation. Moreover, as the aqueous effluent leaving the acidification stage contains minimal amounts of sulfates and sulfides, the biogas formed in the methane fermentation stage will, as a result of this process, contain only minimal amounts of hydrogen sulfide. The hydrogen sulfide recovered from the acidification may be converted into a product of greater value such as sulfur, NaHS-solute, $SO_2$ and $SO_3$ and/or $H_2SO_4$ (for example, $H_2SO_4$ with a concentration of 20%).

The simultaneous acidification and sulfate reduction may be achieved in conventional and well-known anaerobic reactors. It will be appreciated by one skilled in the art that various reactors can be used in the present process such as a UASB reactor, a fluidized-bed reactor, an anaerobic filter or a down-flow stationary fixed film process. In such processes, if internal gas stripping takes place, sometimes the efficiency in keeping the acidifying biomass inside the reactor, because of the gas present in the system, has to be controlled.

When a gas stripper is situated outside the acidification reactor, the conditions in the process have to be selected to achieve a high liquid recirculation over the gas stripper in case of high sulfate conversions. For example, when the sulfate concentration in the influent amounts to 1000 mg S/l, the recirculation ratio has to be chosen to remain below a desired sulfide concentration in the anaerobic reaction space.

Therefore, in the preferred embodiment of the invention, a fluidized bed reactor is used for simultaneous acidification and sulfate reduction and advantageously, superficial liquid velocities of 5-30 m/h are used in this reactor. In the fluidized bed reactor, carrier particles preferably having an average dimension smaller than 3 mm, more preferably smaller than 1 mm are used and the density of the carrier is preferably at least 1200 kg/m$^3$, more preferably 1500–4000 kg/m$^3$ and the mean concentration of the carrier under process conditions in the reactor is preferably smaller than 400 kg/m$^3$ reactor volume. For example, river gravel silver sand, eiffel-lava are suitable carriers.

In a preferred embodiment of the invention, the hydrogen sulfide is removed using a purge gas. In another preferred embodiment of the invention, the hydrogen sulfide is removed by creating a zone of subatmospheric pressure above the reaction liquid so that the hydrogen sulfide can be removed from this zone. The reaction liquid is the liquid in the acidification process and/or the liquid in the optional gas stripping device situated externally to the acidification reactor.

In a gas-lift fluidized bed reactor, the purge gas may be used to obtain the gas lift in the reaction space for internal gas stripping. In still another preferred embodiment of the invention, a fluidized bed reactor with an external gas stripper is used. The external gas stripper gives the possibility of obtaining more independent process parameters.

When using a purge gas in the stripper, gas strippers known per se or which are conventionally designed can be used. When subatmospheric pressure is created above the liquid in the gas stripper, all the dissolved gases will escape from the liquid for example H$_2$S, CO$_2$, CH$_4$, etc. An advantage of this method is that the hydrogen sulfide is concentrated in the gas leaving the gas stripper, while the methane formed in the methanization stage is substantially free of hydrogen sulfide. The gases from the external gas stripper are removed optionally together with the gas formed in the acidification.

In all these embodiments, it is important to know the maximum sulfide level that may be maintained in the reactor without inhibition of the acidification. As is shown by Starky in "Sulfate-reduing bacteria-physiology and practical significance", University of Maryland (1960), the sulfate reducers can tolerate sulfide concentration up to 2000 mg S/l, corresponding to the reduction of 6 g SO$_4$/l. Their growth is most rapid at reactions close to neutrality bu the limiting conditions are about pH 5.5–9.0.

During experimentation, it was found that in this pH region the required reactor volume wiil decrease with an increasing pH, while on the other hand, the purge gas flow which is necessary to achieve the allowable sulfide concentration will decrease with lower pH values. It was found by experimentation that the pH in the acidification process is advantageously 5 to 8, while the temperature in the acidification process is 25° to 45° C. Preferably, the pH is maintained at 6 to 7 in the acidification process. Preferably, the sulfide content in the acidification reactor under such reaction conditions is lower than about 200 mg S/l.

The sulfate reduction and the stripping of hydrogen sulfide produces an increase in the pH. For example, an increase of the pH of 1 to 2 units is observed when waste water having a sulfate concentration of 4000 mg/l is used. Therefore, the pH has to be controlled, for example by adding acid to the waste water. Another possibility is the use of a purge gas containing carbon dioxide, preferably biogas containing carbon dioxide, which will reduce or even prevent this acid consumption. Preferably at least 80% of the hydrogen sulfide is stripped by the purge gas. The purge gas then contains suitably at least 0.5% (v/v) of hydrogen sulfide, preferably about 2 to 5% (v/v) of hydrogen sulfide.

The acidification efficiency is calculated as:

$$\text{acidification efficiency} = \frac{COD_{sum\ value\ of\ the\ effluent\ VFA^*}}{COD_{centrifuged\ effluent\ acidification}} \times 100\%$$

*VFA = Volatile Fatty Acids

Preferably, such conditions are determined so that the acidification efficiency of the effluent will have a value of at least 40% and typical acidification percentages are 45 to 70% depending on the kind of waste water to be purified. For example, with space loadings of the acidification of 50 kg COD/m$^3$ per day and an overall efficiency of about 60%, the conversion capacities will be 30 kg COD/m$^3$ per day.

The sulfate reduction capacity in the fluidized bed acidification stage will increase rapidly in the first few days after the introduction of the necessary microorganisms. For example, after inoculation with suitable sludge originating from a waste water treatment process, the sulfate reduction increased to almost 100% within two weeks in a fluidized-bed process, when waste water with a sulfate level of 1500 mg/l was treated.

The effluent of the acidification stage of the present process is preferably treated in a methanation stage. In an embodiment of the invention, two acidification stages are connected in series to obtain very high conversions of the sulfate.

It will be appreciated by those skilled in the art that any suitable methane fermentation reactor can be used in connection with the present process, such as a UASB reactor, a fluidized-bed reactor, an anaerobic filter or a down-flow stationary fixed film process.

FIG. 1 shows schematically an embodiment of the process of the present invention in which an external gas stripper is used.

In the following examples there are described several preferred embodiments to illustrate the invention. However, it should be understood that the invention is not intended to be limited to the specific embodiments.

EXAMPLE 1

The flow sheet of the example is shown in FIG. 1 and the tests were performed in a fluidized bed reactor (1) with a total volume of 1000 ml. The reactor volume without the settler (2) was 820 ml and sand with a diameter of 0.25 to 0.4 mm was used as carrier material. The reactor was inoculated with 50 ml of sludge from a pilot-plant acidifying fluidized bed reactor. The internal diameter of the reactor was 4 cm, the height 48 cm and the superficial liquid velocity was about 15 m/h. This was achieved by a peristaltic tubing pump (3). The hydraulic retention time in the reactor was adjusted to about 4 hours and the methane fluidized bed reactor (22) was identical to reactor (1). The reactors were placed in a thermostatic controlled case and the temperatures in the reactors were adjusted to a temperature of 35°±1° C. (acidification stage) and 32°±1° C. (methanization stage).

The hydrogen sulfide was stripped with a purge gas (12) consisting of technical nitrogen-gas in a gas stripper (13) with a diameter of 4.5 cm and a volume of 0.47 l. The nitrogen was distributed by means of a tube of sintered glass. The ratio purge gas flow/influent waste water flow was adjusted about 25±5 and in the gas stripper itself, the ratio purge gas flow/recirculation flow was about 0.3.

The waste water (4) consisted of a diluted yeast waste water with a COD of 10–14 g/l. The sulfate additions were 0.4 ml of 36N $H_2SO_4$/l influent and 1.24 g of $K_2SO_4$/l influent corresponding to 14.4 meq acid/l and resulting in a sulfate concentration of 1.5 g/l. 5 ppm of $Fe^{++}$ and 4 ppm of phosphate ($PO_4^{3-}$) were also added.

The different analyses were performed in grab samples and VFA, COD and sulfate were determined on supernatant samples prepared by centrifugation at 15,000 RPM for 10 minutes. The COD mixed samples were collected from the overflow through the tube system.

During the test, the pH was adjusted (6) only by the addition (11) of sulfuric acid to the influent and this additional supply of sulfuric acid above the addition of 14.4 meq acid/l to the waste water was necessary to repress the pH increase which is attributed primarily to the sulfate reduction process (see equation 1) in combination with the fact that the waste water was weakly buffered.

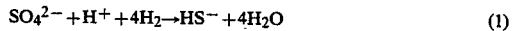

$$SO_4^{2-} + H^+ + 4H_2 \rightarrow HS^- + 4H_2O \quad (1)$$

Hydrogen sulfide is a weak acid and will act as a buffer. For bisulfide (see equation 2), the maximum buffer index is obtained at pH=pKa=7.

$$H^+ + HS^- \rightleftharpoons H_2S \quad pKa=7 \quad (2)$$

For those reasons, the reduction of 1.5 g $SO_4$/l will increase the alkalinity by about 15 meq/l.

After the inoculation, the sulfate reduction increased in about ten days to a level of nearly 100% and about 82 to 92% of the $H_2S$ produced was stripped in the gas stripper. The space loading of the acidification was about 66 kg COD/$m^3$ per day based on the reactor volume of 1 liter. The average of the flow rate was 0.25 l/h and the influent concentration was 11 g COD/l. The overall efficiency was about 67% and the conversion capacity was 44 kg COD/$m^3$ per day. The sludge conversion capacity for volatile fatty acids came to 4 kg COD/kg VSS per day. When the combined sulfate reduction and acidification process reached a steady state, the end product was mainly acetic acid.

The methane fermentation which occurred partly in the acidification stage and the removal of hydrogen sulfide by the purge gas both result in a COD removal in the combined sulfate reduction and acidification process. The biogas production (5) was substantial with a COD removal of 900 to 1400 mg COD/l and the sulfate conversion capacity was about 8.1 kg/$SO_4$/$m^3$ per day.

EXAMPLE 2

The procedure of Example 1 was repeated but the sulfate concentration of the influent was increased to a value of 4.3 g $SO_4$/l and 1000 mg/l of propionic acid was added to the influent. Other conditions were maintained as in Example 1 except for changes mentioned later on. After a period, the process ran steady while 4.0 g $SO_4$/l was reduced. The sulfate reduction capacity was 21 kg $SO_4$/$m^3$ per day (based on the volume of reactor and a flow rate of 0.25 l/h), corresponding with the conversion of 13.9 kg COD/$m^3$ per day. The sludge conversion capacity was about 2 kg $SO_4$/kg VSS per day.

The space loading of the acidification was 84 kg COD/$m^3$ per day based on the reactor volume of 1 liter and an hydraulic retention time of about 4 hours. The average of the flow rate was 0.25 l/h and the influent concentration 14 g COD/l. When the overall efficiency was about 67%, the conversion capacities were 56 kg COD/$m^3$ per day. The sludge acidification capacity for volatile fatty acids came to 6 kg COD/kg VSS per day and when the combined sulfate reduction and acidification process had reached a steady state, the end product was mainly acetic acid.

About 1.5 to 2 g of $H_2S$-COD/l waste water was removed by stripping. In addition, with the production of 1.4 g biomass COD/l waste water, this resulted in a COD reduction (centrifuged effluent samples) of about 3 g COD/l. At least 85% of the produced $H_2S$ was stripped by the purge gas and the $H_2S$ content of the purge gas (14) after leaving the gas stripper was 2 to 5%. The sulfate reduction and the stripping of hydrogen sulfide produced an increase of the pH with 1 to 2 units and the control of the pH to repress this increase to a value of 6.7 required about 5 meq acid/g COD.

The effluent of the acidification was connected with the recirculation (24) of the methane fluidized bed reactor (22) (see FIG. 1) and both were pumped (22) into the methane reactor. The effluent of the methane reactor was removed via outlet 25. The methane reactor started with about 600 ml of sludge from a full-stage methanization fluid bed process, supplied with 200 g of sand of 0.2 to 0.4 mm and 50 g of 0.8 to 1.25 mm. The gas production (23) increased in ten days until the conversion capacity was about 14 kg COD/$m^3$ per day. The VFA were converted in that period with an efficiency of 90%, and the overall (acidification+methanization) COD-removal efficiency was 60%. The overall reactor loading was about 41 kg COD/$m^3$ per day and the conversion was 24 kg COD/$m^3$ per day.

EXAMPLE 3

Industrial soybean waste water enriched with 3700 mg/l of sulfate was used and the conditions were maintained as in Example 1 except for the methane reactor where, in this example, a UASB-reactor (USAB=upflow anaerobic sludge blanket) was used and as support material in the fluidized-bed acidification reactor, lava of 0.2 to 0.3 mm was used. After a period, the process ran steadily while 2.8 g $SO_4$/l was reduced (75%). The sulfate reduction capacity was 20 kg $SO_4$/$m^3$ per day (based on the volume of the reactor) corresponding to the conversion of 12 kg COD/$m^3$ per day and the sludge conversion capacity was about 0.6 kg of $SO_4$/kg VSS per day.

The space loading of the acidification was 85 kg COD/$m^3$ per day based on the reactor volume of 1.0 liter and a hydraulic retention time of about 3 hours. The average of the flow rate was 0.3 l/h and the influent concentration 11.4 g COD/l. When the overall efficiency was about 80%, the conversion capacity was 68 kg COD/$m^3$ per day. The sludge conversion capacity for volatile fatty acids came to 2.2 kg COD/kg VSS per day. When the combined sulfate reduction and acidification process reached a steady state, the end product was mainly acetic acid. At least 70% of the produced $H_2S$ had been stripped by the purge gas and the $H_2S$ content of the purge gas and the $H_2S$ content of the purge gas (14) after leaving the gas stripper was 2 to 3%.

In the combined acidification and sulfate reduction process, COD-removal efficiencies of about 34% were achieved and in this example, the pH in the acidification stage was maintained at 6.5. At the end of the test, the reactor and stripper contained 32.3 g VSS and the biomass concentration in the reactor was 31.5 g VSS/l while 2% of it was present as suspended solids. The support overgrowth amounts to 110 mg VSS/g support.

The effluent of the acidification/sulfate reduction reactor was connected with the recirculation of the UASB-reactor and the hydraulic retention time in this reactor was about 9.0 hours. The conversion efficiency of the volatile fatty acids was over 90%, the overall soluble COD removal efficiency was 85% and the overall total COD-removal efficiency was 80%. The reactor loading was about 15 kg COD/m$^3$ per day. The UASB-reactor was started with about 1.25 l of granular sludge from an industrial scale UASB reactor used for the purification of effluent from a sugar industry plant. The amount of the inoculated sludge was approximate 100 g of dry suspended solids (about 80 g VSS).

Various modifications of the process of the invention may be made without departing from the spirit or scope thereof and it is to be understood that the invention is intended to be limited only as defined in the appended claims.

What I claim is:

1. In a process for the purification of waste water containing sulfate and organic material by anaerobic biological waste water treatment, the improvement comprising converting at least 80% of the sulfate into hydrogen sulfide in an acidification process and removing at least 70% of the resulting hydrogen sulfide from the waste water using a purge gas.

2. The process of claim 1 wherein the acidification takes place in a fluidized bed reactor.

3. The process of claim 2 wherein the superifical liquid velocity in the fluidized bed reactor is 5 to 30 m/h and the carrier particles have an average dimension smaller than 3 mm in the fluidized bed reactor with the density of the carrier being at least 1200 kg/m$^3$.

4. The process of claim 3 wherein the carrier particles have an average dimension smaller than 1 mm, the density of the carrier is 1500 to 4000 kg/m$^3$ and the mean concentration of the carrier under proces conditions in the reactor is less than 400 kg/m$^3$ reactor volume.

5. The process of claim 1 wherein the purge gas contains carbon dioxide.

6. The process of claim 5 wherein biogas is used as purge gas.

7. The process of claim 1 wherein the resulting hydrogen sulfide is removed in a gas stripper situated outside the reactor used for the acidification process.

8. The process of claim 1 wherein the hydraulic retention time in the acidification is 1 to 10 hours.

9. The process of claim 1 wherein in the acidification process, the pH is between 5 to 8 and the temperature is 25° to 45° C.

10. The process of claim 9 wherein the pH is 6 to 7 in the acidification process.

11. The process of claim 1 wherein the sulfide concentration in the acidification is kept below 200 mg S/l.

12. In a process for the purification of waste water containing sulfate and organic material by anaerobic biological waste water treatment, the improvement comprising converting at least 80% of the sulfate into hydrogen sulfide in an acidification process and removing at least 70% of the resulting hydrogen sulfide from the waste water by creating a zone of subatmospheric pressure above the reaction liquid and removing the hydrogen sulfide from the zone.

* * * * *